US012287474B2

United States Patent
Li et al.

(10) Patent No.: US 12,287,474 B2
(45) Date of Patent: Apr. 29, 2025

(54) SUPER-RESOLUTION MICROSCOPIC IMAGING METHOD AND APPARATUS, COMPUTER DEVICE, AND STORAGE MEDIUM

(71) Applicant: GUANGZHOU COMPUTATIONAL SUPER-RESOLUTION BIOTECH CO., LTD., Guangzhou (CN)

(72) Inventors: Haoyu Li, Guangzhou (CN); Weisong Zhao, Guangzhou (CN); Shiqun Zhao, Guangzhou (CN)

(73) Assignee: GUANGZHOU COMPUTATIONAL SUPER-RESOLUTION BIOTECH CO., LTD., Guangzhou (CN)

( * ) Notice: Subject to any disclaimer, the term of this patent is extended or adjusted under 35 U.S.C. 154(b) by 0 days.

(21) Appl. No.: 18/548,913

(22) PCT Filed: Sep. 26, 2022

(86) PCT No.: PCT/CN2022/121400
§ 371 (c)(1),
(2) Date: Sep. 4, 2023

(87) PCT Pub. No.: WO2024/065094
PCT Pub. Date: Apr. 4, 2024

(65) Prior Publication Data
US 2025/0052994 A1 Feb. 13, 2025

(51) Int. Cl.
*G02B 21/36* (2006.01)
*G02B 21/00* (2006.01)
(Continued)

(52) U.S. Cl.
CPC ....... *G02B 21/367* (2013.01); *G02B 21/0076* (2013.01); *G06T 3/4076* (2013.01);
(Continued)

(58) Field of Classification Search
CPC ............. G02B 21/367; G02B 21/0076; G06T 3/4076; G06T 5/70; G06T 2207/10056; G06T 2207/10064
(Continued)

(56) References Cited

U.S. PATENT DOCUMENTS 7,872,798 B2 * 1/2011 Osawa ............... G02B 21/0072
359/368
11,189,016 B1 11/2021 Chen
(Continued)

FOREIGN PATENT DOCUMENTS

CN   102708543       10/2012
CN   102708543 A  *  10/2012
(Continued)

*Primary Examiner* — Marnie A Matt
(74) *Attorney, Agent, or Firm* — JMB Davis Ben-David (57) ABSTRACT

Disclosed are a super-resolution microscopic imaging method and apparatus, a computer device, and a storage medium. The method includes the following steps: collecting a fluorescent signal sequence of a set of samples to be observed; determining the number of iterations of deconvolution; performing an iteration of pre-deconvolution on each frame of an initial image in the fluorescent signal sequence before outputting when the iteration reaches half of the number of iterations; performing two reconstructions on the output image; and performing a second iteration of deconvolution on the image after the two reconstructions before outputting when the iteration reaches the number of iterations or half of the number of iterations. The present disclosure, with advantages of non-parameterization, high throughput, and high resolution, can overcome the shortcomings and deficiencies of the prior art, and can be widely coupled to various imaging modalities, such as acoustic microscopy, that is, photoacoustic and ultrasound microscopic imaging technology.

12 Claims, 5 Drawing Sheets

(51) Int. Cl.
  *G06T 3/4076* (2024.01)
  *G06T 5/70* (2024.01)
(52) U.S. Cl.
  CPC ...... *G06T 5/70* (2024.01); *G06T 2207/10056* (2013.01); *G06T 2207/10064* (2013.01)
(58) Field of Classification Search
  USPC .......................................................... 348/79
  See application file for complete search history.

(56) References Cited

U.S. PATENT DOCUMENTS

| | | | |
|---|---|---|---|
| 11,385,448 B2* | 7/2022 | Okada | G02B 21/362 |
| 2016/0195704 A1* | 7/2016 | Kalkbrenner | G02B 21/365 |
| | | | 348/79 |
| 2020/0103347 A1* | 4/2020 | Okada | G02B 21/24 |
| 2021/0356757 A1* | 11/2021 | Weigel | G02B 21/16 |
| 2021/0383516 A1* | 12/2021 | Chen | G06T 5/10 |

FOREIGN PATENT DOCUMENTS

| | | | | |
|---|---|---|---|---|
| CN | 106770131 | | 5/2017 | |
| CN | 106952233 | | 7/2017 | |
| CN | 108318464 | | 7/2018 | |
| CN | 108318464 A | * | 7/2018 | |
| CN | 113112405 | | 7/2021 | |
| CN | 113971722 | | 1/2022 | |
| CN | 114998100 | | 9/2022 | |
| WO | 2009095296 | | 8/2009 | |
| WO | WO-2015164844 A1 | * | 10/2015 | ......... G01N 21/6428 |

* cited by examiner

SUPER-RESOLUTION MICROSCOPIC IMAGING METHOD AND APPARATUS, COMPUTER DEVICE, AND STORAGE MEDIUM

CROSS-REFERENCE TO RELATED APPLICATIONS

This is the US National Stage of International Patent Application No. PCT/CN2022/121400 filed Sep. 26, 2022.

FIELD OF THE INVENTION

The present disclosure relates to a super-resolution microscopic imaging method and apparatus, a computer device, and a storage medium in the field of computational imaging and super-resolution microscopic imaging.

BACKGROUND OF THE INVENTION

Super-resolution optical fluctuation imaging (SOFI), based on the fluctuation model of molecular intensity signal, uses the physical model of the random fluctuation of intensity of fluorescent molecules and does not rely on any hardware modulation, which is a flexible and highly cost-effective super-resolution means. Due to its hardware system-independent nature, it is flexibly coupled to different imaging modalities. The disadvantages of such apparatuses are the low temporal resolution of existing fluorescence super-resolution methods, requiring at least 500 to 1000 consecutive collections of images to achieve the desired high-quality super-resolution effect, which hinders their application in live cell super-resolution imaging. Therefore, there is a need to provide a method that maximizes the use of the fluorescence fluctuation behavior detectable in each measurement to achieve the desired high temporal resolution and high throughput.

SUMMARY OF THE INVENTION

In view of the above, the present disclosure provides a super-resolution microscopic imaging method and apparatus, a computer device, and a storage medium, with the advantages of non-parameterization, high throughput, and high resolution, which can overcome the shortcomings and deficiencies of the prior art.

The first object of the present disclosure is to provide a super-resolution microscopic imaging method.

The second object of the present disclosure is to provide a super-resolution microscopic imaging apparatus.

The third object of the present disclosure is to provide a computer device.

The fourth object of the present disclosure is to provide a storage medium.

The first object of the present disclosure may be achieved by adopting the following technical solutions:

A super-resolution microscopic imaging method includes:
collecting a fluorescent signal sequence of a set of samples to be observed;
determining the number of iterations of deconvolution;
performing an iteration of pre-deconvolution on each frame of an initial image in the fluorescent signal sequence before outputting when the iteration reaches half of the number of iterations;
performing two reconstructions on the output image; and
performing a second iteration of deconvolution on the image after the two reconstructions before outputting when the iteration reaches the number of iterations or half of the number of iterations.

In one embodiment, after the collecting a sequence of a set of samples to be observed, it further includes:
estimating a background of the fluorescent signal using a wavelet transformation and removing background noise.

In one embodiment, the estimating a background of the fluorescent signal using a wavelet transformation and removing background noise specifically includes:
estimating the background from a lowest frequency of an input image using wavelet estimation;
performing a wavelet inverse transformation on a lowest frequency band to a spatial domain, comparing a result with half of a square root of the input image, and combining the two images by keeping a minimum value of each pixel; and
taking estimated low-frequency band low-peak background data as a new input image, and performing wavelet estimation circularly until the preset number of cycles is reached.

In one embodiment, the determining the number of iterations of deconvolution specifically includes:
using rolling Fourier ring correlation (FRC) to determine, and taking the number of iterations at maximum rolling FRC resolution as the number of iterations of deconvolution.

In one embodiment, the using rolling FRC to determine, and taking the number of iterations at maximum rolling FRC resolution as the number of iterations of deconvolution specifically includes:
taking the rolling FRC as a function of spatial frequency, and defining discretization of the spatial frequency of a rolling FRC curve to calculate a discrete value of the corresponding spatial frequency;
smoothing the rolling FRC curve with noise using an average filter with average window half-width;
defining, when the rolling FRC curve is lower than a given threshold, the frequency as an effective cutoff frequency and the resolution as a reciprocal of the effective cutoff frequency, the given threshold representing a maximum spatial frequency of meaningful information outside the random noise; and
taking the number of iterations at maximum resolution as the number of iterations of deconvolution.

In one embodiment, the performing two reconstructions on the output image specifically includes:
performing a first reconstruction on the output image using a fluctuation principle of the fluorescent signal; and
performing a second reconstruction on the image after the first reconstruction using sparsity-continuity joint constraints.

In one embodiment, the performing a first reconstruction on the output image using a fluctuation principle of the fluorescent signal specifically includes:
acquiring an expression of the fluorescent signal according to a point spread function (PSF), a luminance constant of a fluorescent molecule, and a function of fluctuation of the luminance of the fluorescent molecule with time of a microscope;
acquiring, according to the expression of the fluorescent signal, an expression of time cumulant with zero-time delay using individual fluctuation characteristics of each fluorescent molecule; and
expanding the expression of the time cumulant, and regarding a cross-correlation term of a time cumulant expansion as zero when a preset condition is met, to make the time cumulant being expressed as the sum of squares of a corresponding luminance constant weighted PSF.

In one embodiment, the performing a second reconstruction on the image after the first reconstruction using sparsity-continuity joint constraints specifically includes:

constructing a reconstruction model, the reconstruction model including a first term, a second term, and a third term, the first term being a fidelity term representing a distance between the image after the first reconstruction and a collected initial image, the second term representing a continuity constraint of the image after the first reconstruction, and the third term representing a sparsity constraint of the image after the first reconstruction; and performing a second reconstruction on the image after the first reconstruction using the reconstruction model.

In one embodiment, the iteration of deconvolution specifically includes:

obtaining an iterative formula by iteratively solving maximum likelihood in a spatial domain; and realizing, according to the iterative formula, an iterative calculation of deconvolution using an acceleration method based on vector extrapolation.

The second object of the present disclosure may be achieved by adopting the following technical solutions:

A super-resolution microscopic imaging apparatus includes:

a collection module, configured to collect a fluorescent signal sequence of a set of samples to be observed;

a determining module, configured to determine the number of iterations of deconvolution;

a pre-deconvolution module, configured to perform an iteration of pre-deconvolution on each frame of an initial image in the fluorescent signal sequence before outputting when the iteration reaches half of the number of iterations;

a reconstruction module, configured to perform two reconstructions on the output image; and a deconvolution module, configured to perform a second iteration of deconvolution on the image after the two reconstructions before outputting when the iteration reaches the number of iterations or half of the number of iterations.

The third object of the present disclosure may be achieved by adopting the following technical solutions:

A computer device includes a processor and a memory for storing processor-executable programs; the processor, when executing the programs stored in the memory, implements the above super-resolution microscopic imaging method.

The fourth object of the present disclosure may be achieved by adopting the following technical solutions:

A storage medium stores programs; the programs, when executed by a processor, implement the above super-resolution microscopic imaging method.

The present disclosure has the following advantageous effects with respect to the prior art:

The present disclosure has the advantages of high flexibility and can be widely coupled to various imaging modalities, such as acoustic microscopy, namely, photoacoustic and ultrasonic microscopy imaging technology; it has the advantage of high throughput, and the post-deconvolution of multiple iterations is used to further process the obtained single image, which can achieve a two-fold improvement in three-dimensional spatial resolution. High-quality super-resolution results can be achieved with only 20 frames or less while maintaining super-resolution, achieving a temporal resolution improvement of 50 to 100 times. With the advantage of non-parameterization, an automatic parameter estimation method based on rolling FRC is proposed to realize non-parameterization, to realize automatic super-resolution high-throughput imaging.

BRIEF DESCRIPTION OF THE DRAWINGS

In order to explain the embodiments of the present disclosure or the technical solutions in the prior art more clearly, a brief introduction will be made to the accompanying drawings used in the embodiments or the description of the prior art. It is obvious that the drawings in the description below are only some embodiments of the present disclosure, and those ordinarily skilled in the art can obtain other drawings according to the structures shown in these drawings without creative work.

DETAILED DESCRIPTION OF THE EMBODIMENTS

In order to make the objects, technical solutions, and advantages of the embodiments of the present disclosure clearer, the technical solutions of the embodiments of the present disclosure will be described clearly and completely with reference to the drawings of the embodiments of the present disclosure. It is obvious that the described embodiments are a part of the embodiments of the present disclosure rather than all the embodiments thereof, and all other embodiments obtained by the ordinarily skilled in the art without inventive effort are within the scope of protection of the present disclosure.

Embodiment 1

Figure 1:
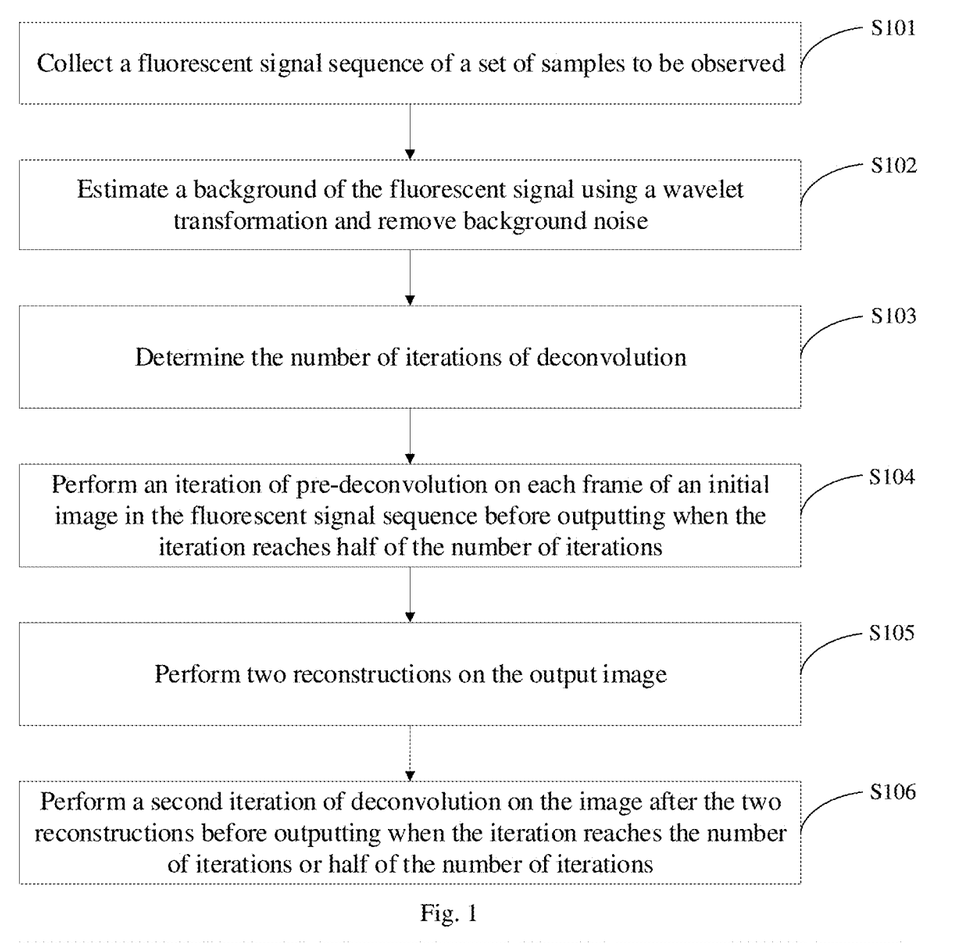
FIG. 1 is a flowchart of a super-resolution microscopic imaging method according to Embodiment 1 of the present disclosure.

As shown in FIG. 1, the embodiment provides a super-resolution microscopic imaging method based on a deconvolution enhancement implementation, including the following steps:

At S101, a fluorescent signal sequence of a set of samples to be observed is collected.

In one embodiment, the number of frames of the fluorescent signal sequence is 20; the skilled in the art may understand that the number of frames of the fluorescent signal sequence may also be 10, 50, and the like.

In one embodiment, for data with weak background or even no background, the background estimation operation may be removed, that is, setting the background parameter value b to zero, to avoid the removal of information; in particular, considering that an image under low-dose illumination generally shows only a low and stable background fluorescence noise distribution, a value exceeding the image mean value is directly set as zero, and the obtained residual image is used for subsequent background estimation.

In one embodiment, after step S101, other conditions than those described above, may further include:

At S102, a background of the fluorescent signal is estimated using a wavelet transformation, and background noise is removed.

In one embodiment, step S102 specifically includes:

At S1021, the background is estimated from a lowest frequency of an input image using wavelet estimation.

In one embodiment, to extract the lowest band in the frequency domain, a two-dimensional Daubechies-6 wavelet filter is used to decompose the signal multilevel to seven levels.

At S1022, a wavelet inverse transformation is performed on a lowest frequency band to a spatial domain, a result is compared with half of a square root of the input image, and the two images are combined by keeping a minimum value of each pixel.

In one embodiment, to prevent accidental removal of small useful signals, the lowest frequency band is performed with a wavelet inverse transformation to the spatial domain; the result is compared to half of the square root of the input image (smoother information); and the two images are combined by keeping the minimum value for each pixel, removing high intensity pixels in the background due to inaccurate background estimation.

At S1023, estimated low-frequency band low-peak background data is taken as a new input image, and wavelet estimation is performed circularly, namely, repeating steps S1021 and S1022 until the preset number of cycles is reached.

In one embodiment, the preset number of cycles is set to 3 to estimate the true fluorescence background with the smallest distribution.

At S102, the number of iterations of deconvolution is determined.

In one embodiment, the determining the number of iterations of deconvolution specifically includes: using rolling FRC to determine, and taking the number of iterations at maximum rolling FRC resolution as the number of iterations of deconvolution.

In one embodiment, the using rolling FRC to determine, and taking the number of iterations at maximum rolling FRC resolution as the number of iterations of deconvolution specifically includes:

At S1021, the rolling FRC is taken as a function of spatial frequency, and discretization of the spatial frequency of a rolling FRC curve is defined to calculate a discrete value of the corresponding spatial frequency.

In one embodiment, the rolling FRC measures the statistical correlation between two two-dimensional signals over a series of concentric rings in the Fourier domain, which may be viewed as a function of spatial frequency $q_i$:

$$FRC_{12}(q_i) = \frac{\sum_{r \in q_i} \mathscr{F}_1(r) \cdot \mathscr{F}_2^*(r)}{\sqrt{\sum_{r \in q_i} |\mathscr{F}_1(r)|^2 \cdot \sum_{r \in q_i} |\mathscr{F}_2^*(r)|^2}},$$

where $\mathscr{F}_1$ and $\mathscr{F}_2$ represent the discrete Fourier transformation of the two signals; and the summation sign represents the sum of the pixels on the circumferential boundary of the corresponding spatial frequency $q_i$.

The discretization of the spatial frequency of the rolling FRC curve is defined to calculate the discrete values of the corresponding spatial frequency; the maximum frequency $f_{max}$ corresponds to half of the inverse of the pixel size $p_s$, that is, $f_{max}=1/(2\ p_s)$; the rolling FRC curve is composed of N/2 values, and the discretization step length $\Delta f$ of the spatial frequency is:

$$\Delta f = \frac{f_{max}}{N/2} = \frac{1}{Np_s}$$

At S1022, the rolling FRC curve with noise is smoothed using an average filter with average window half-width.

In one embodiment, an average filter with average window half-width (typically equal to 3) is used to smooth the rolling FRC curve with noise.

At S1023, when the rolling FRC curve is lower than a given threshold, the frequency is defined as an effective cutoff frequency and the resolution as a reciprocal of the effective cutoff frequency, the given threshold representing a maximum spatial frequency of meaningful information outside the random noise.

In one embodiment, when the rolling FRC curve is lower than a given threshold, the frequency is defined as the effective cutoff frequency and the resolution as the reciprocal of the effective cutoff frequency, the given threshold representing the maximum spatial frequency of meaningful information outside of random noise; specifically, a common choice for the threshold is a fixed value threshold or a sigma factor curve. The fixed value is usually a ⅐ hard threshold, and the criterion for the sigma factor curve may be written as:

$$\sigma_i = \frac{\sigma_{factor}}{\sqrt{N_i/2}},$$

where $N_i$ represents the number of pixels in a ring of radius $q_i$, and the most commonly used sigma factor is 3; if the two measured values only contain noise, then the rolling FRC curve may be expressed as $FRC_i=1/\sqrt{N_i}$; therefore, the 3-sigma factor curve is actually a frequency component with correlation degree three times greater than pure noise, which is determined as relatively valid information.

At S1024, the number of iterations at maximum resolution is taken as the number of iterations of deconvolution.

In one embodiment, the number of iterations at the maximum resolution is denoted as k; k is the number of iterations of deconvolution.

At S103, an iteration of pre-deconvolution is performed on each frame of an initial image in the fluorescent signal sequence before outputting when the iteration reaches half of the number of iterations.

In one embodiment, when the iteration reaches half of the number of iterations determined in step S102, the iteration of pre-deconvolution is completed, and by performing pre-deconvolution, the effective on/off contrast and signal-to-noise ratio of the signal may be improved; and the iteration of deconvolution specifically includes:

At S1031, an iterative formula is obtained by iteratively solving maximum likelihood in a spatial domain.

In one embodiment, the deconvolution uses a Richardson-Lucy (RL) algorithm; the deconvolution model is based on a Poisson noise model; and the way of solving a maximum likelihood iteratively in a spatial domain is used to obtain the following iterative formula:

$$f^{n+1}(x, y) = f^n(x, y)\left[\left(\frac{g(x, y)}{h(x, y) \otimes f^n(x, y)}\right) \odot h(x, y)\right],$$

where x and y are spatial coordinates; h represents a PSF of a microscope; f represents a real fluorescent signal in the physical world; and g represents a signal acquired by a final microscope.

At S1032, according to the iterative formula, an iterative calculation of deconvolution is realized using an acceleration method based on vector extrapolation.

In one embodiment, in order to speed up the iterative convergence rate, the iterative calculation of the deconvolution is realized using an acceleration method based on vector extrapolation:

$$y^{j+1} = x^j \cdot \left(h^T \cdot \frac{g}{h \cdot x^j}\right)$$
$$v^j = x^{j+1} - y^j$$
$$\alpha^{j+1} = \frac{\sum v^j \cdot v^{j-1}}{\sum v^{j-1} \cdot v^{j-1}}$$
$$x^{j+1} = y^{j+1} + \alpha^{j+1} \cdot (y^{j+1} - y^j),$$

where g is the reconstructed image constrained by previous prior knowledge; h represents the PSF of the microscope; $x^{j+1}$ is the image after j+1 iterations; and $\alpha$ is an adaptive acceleration factor.

At S104, two reconstructions are performed on the output image.

In one embodiment, step S104 specifically includes:

At S1041, a first reconstruction is performed on the output image using a fluctuation principle of the fluorescent signal.

At S10411, an expression of the fluorescent signal is acquired according to a PSF, a luminance constant of a fluorescent molecule, and a function of fluctuation of the luminance of the fluorescent molecule with time of a microscope.

In one embodiment, the imaging sample is generally considered to be composed of N individual fluorescent molecules at rk; provided that the fluorescent molecules have independent molecular luminance over time, the fluorescent signal at r and time t is represented as:

$$F(r, t) = h(r - r_k) \cdot c_k \cdot \omega_k(t),$$

where h, c, and $\omega$ represent a PSF, a luminance constant of a molecular, and a function of fluctuation of luminance of the molecular with time of the corresponding microscope, respectively.

At S10412, according to the expression of the fluorescent signal, an expression of time cumulant with zero-time delay is acquired using individual fluctuation characteristics of each fluorescent molecule.

In one embodiment, the time cumulant is a second-order time cumulant, and it is understood by the skilled in the art that the time cumulant may also be a third-order time cumulant or a fourth-order time cumulant.

In one embodiment, according to the fluorescence fluctuation super-resolution imaging technique, using this individual fluctuation characteristic of each fluorescent molecule, the relevant cumulant of each pixel along the t-axis is calculated to improve the resolution, and the second-order time cumulant $G_2$ of the zero delay is calculated to obtain the following formula:

$$G_2(r) = \langle \delta F(r, t) \cdot \delta F(r, t) \rangle_t$$
$$\delta F(r, t) = F(r, t) - \langle F(r, t) \rangle_t,$$

where $\langle \cdot \rangle$ is a time average function.

At S10413, the expression of the time cumulant is expanded, and a cross-correlation term of a time cumulant expansion is regarded as zero when a preset condition is met, to make the time cumulant being expressed as the sum of squares of a corresponding luminance constant weighted PSF.

In one embodiment, the expression of the second-order time cumulant $G_2$ is expanded to obtain the following formula:

$$G_2(r) = \sum_{i,k} h(r - r_i) \cdot h(r - r_k) \cdot c_i \cdot c_k \cdot \langle \delta \omega_i(t) \delta \omega_k(t) \rangle_t$$

Assuming that the luminescence intensity of each fluorescent molecule is an uncorrelated individual fluctuation, when i≠k (a preset condition), the cross-correlation term in the expansion formula is considered as zero, and the second-order time cumulant $G_2$ is expressed as the sum of the squares of the corresponding luminance constant γ-weighted PSF, as follows:

$$G_2(r) = \sum_i h(r - r_i)^2 \cdot c_i^2 \cdot \langle \delta \omega_i(t)^2 \rangle_t = \sum_i h(r - r_i)^2 \cdot \gamma_i$$

At S1042, a second reconstruction is performed on the image after the first reconstruction using sparsity-continuity joint constraints.

At S10421, a reconstruction model is constructed, the reconstruction model including a first term, a second term, and a third term, the first term being a fidelity term representing a distance between the image after the first reconstruction and a collected initial image, the second term representing a continuity constraint of the image after the first reconstruction, and the third term representing a sparsity constraint of the image after the first reconstruction.

In one embodiment, the reconstruction model is constructed as follows:

$$\operatorname*{argmin}_{x,b} \left\{ \frac{\lambda}{2} \|f - b - Ax\|_2^2 + R_{Hessian}(x) + \lambda_{L1} \|x\|_1 \right\},$$

where the first term on the left side is a fidelity term representing the distance between the restored image x and the collected initial image f; A is a PSF of the optical system; the second term and the third term are continuity and sparsity constraints, respectively; $\|\cdot\|_1$ and $\|\cdot\|_2$ are $\ell_1$ and $\ell_2$ norms respectively; and $\lambda$ and $\lambda_{L1}$ represent the weights of the fidelity and sparsity constraints, respectively; the Hessian matrix continuity prior for the xy-t(z) axis is defined as:

$$R_{Hessian}(g) = \left\| \begin{array}{ccc} g_{xx} & g_{xy} & \sqrt{\lambda_t}\, g_{xt} \\ g_{yx} & g_{yy} & \sqrt{\lambda_t}\, g_{yt} \\ \sqrt{\lambda_t}\, g_{tx} & \sqrt{\lambda_t}\, g_{ty} & \lambda_t g_{tt} \end{array} \right\|_1$$

$$= \|g_{xx}\|_1 + \|g_{yy}\|_1 + \lambda_t \|g_{tt}\|_1 +$$

$$2\|g_{xy}\|_1 + 2\sqrt{\lambda_t}\, \|g_{xt}\|_1 + 2\sqrt{\lambda_t}\, \|g_{yt}\|_1$$

At S10422, a second reconstruction is performed on the image after the first reconstruction using the reconstruction model.

At S106, a second iteration of deconvolution is performed on the image after the two reconstructions before outputting when the iteration reaches the number of iterations or half of the number of iterations.

In one embodiment, the second iteration of deconvolution is completed when the iteration reaches half of the number of iterations determined in step S102 (that is, k/2 times), and both the iteration of pre-deconvolution and the second iteration of deconvolution are k/2 times, just reaching the number of iterations determined in step S102; the specific content of the second iteration of deconvolution may be seen in step S103, which will not be repeated herein; and by performing two iterations of deconvolution (the iteration of pre-deconvolution and the second iteration of deconvolution), the resolution is further improved while maintaining the image quality and minimizing the artifact.

The skilled in the art will appreciate that the second iteration of deconvolution may also be completed when the iteration reaches the number of iterations determined in step S102.

Figure 2:
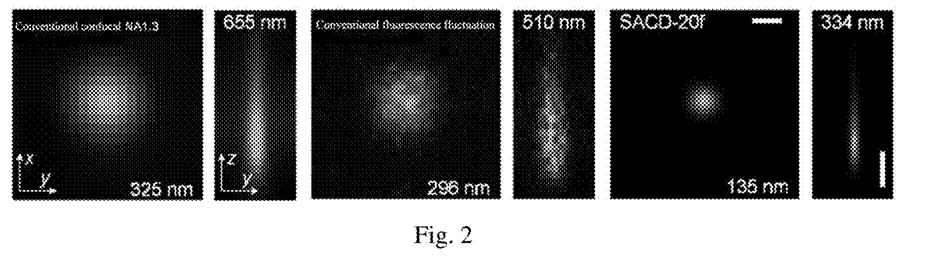
FIG. 2 is an exemplary result diagram of three-dimensional spatial resolution enhancement according to Embodiment 1 of the present disclosure.

FIG. 2 is an exemplary result diagram showing three-dimensional spatial resolution enhancement of the embodiments of the present disclosure, which can achieve a 2-fold enhancement in three-dimensional spatial resolution compared to a conventional confocal mode, using the method of an embodiment of the present disclosure to measure the three-dimensional PSF of a quantum dot (QD525) sample, acquiring a sequence of images with a standard rotating disk confocal microscope, and separately extracting the transverse/axial half-height widths of such a molecular point source. The transverse/axial half-height widths of the conventional confocal mode are 325/655 nm, and the conventional fluorescence fluctuation mode is 295/510 nm, while the embodiment of the present disclosure is 135/334 nm.

Figure 3:
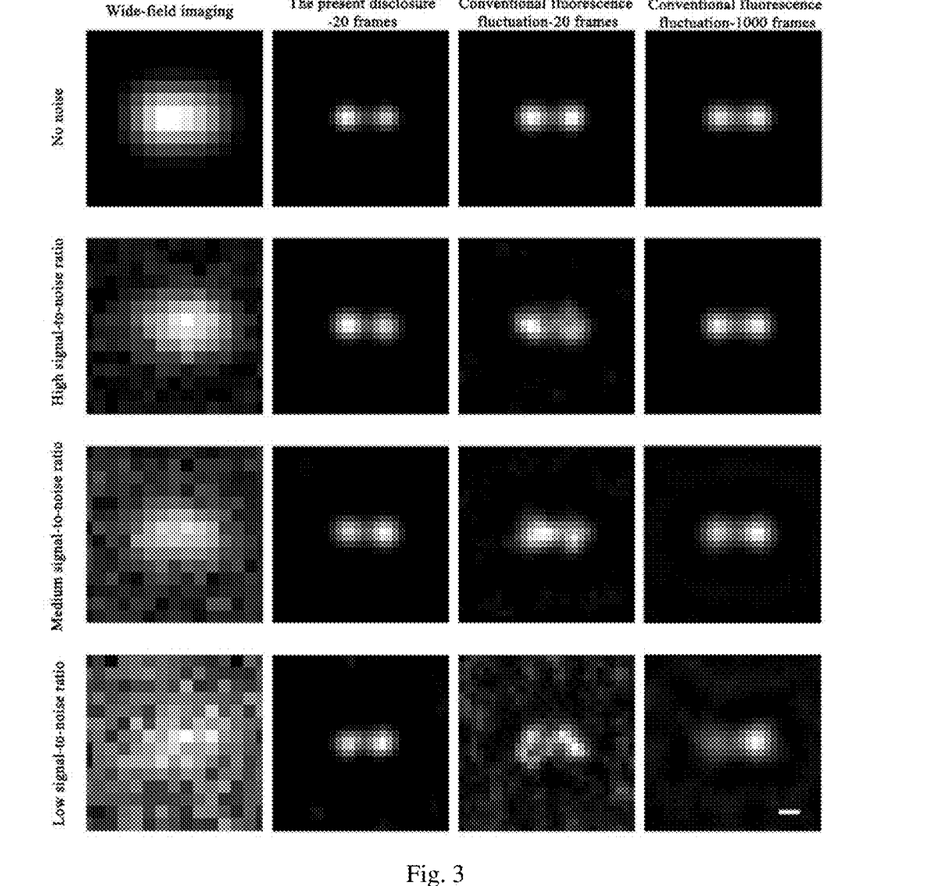
FIG. 3 is an exemplary result diagram of temporal resolution enhancement according to Embodiment 1 of the present disclosure.

FIG. 3 is an exemplary result diagram showing temporal resolution enhancement of the embodiments of the present disclosure (microtubules labeled with quantum dots in COS-7 cells). The embodiments of the present disclosure can achieve a high-quality super-resolution effect with only 20 frames while maintaining super-resolution, achieving a 50 to 100 times temporal resolution enhancement compared to the conventional fluorescence fluctuation technique SOFI, which requires 1000 frames of image reconstruction to maintain relatively stable performance with the decrease of the signal-to-noise ratio, whereas the embodiment of the present disclosure can reconstruct a two-point structure with high fidelity using only 20 frames of image under all conditions.

Figure 4:
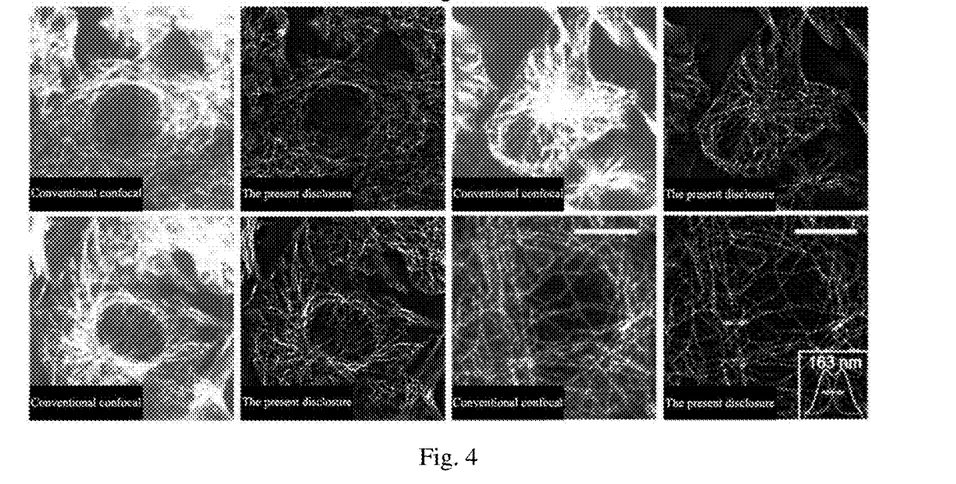
FIG. 4 is an exemplary result diagram of non-parametric reconstruction capability according to Embodiment 1 of the present disclosure.
Figure 5:
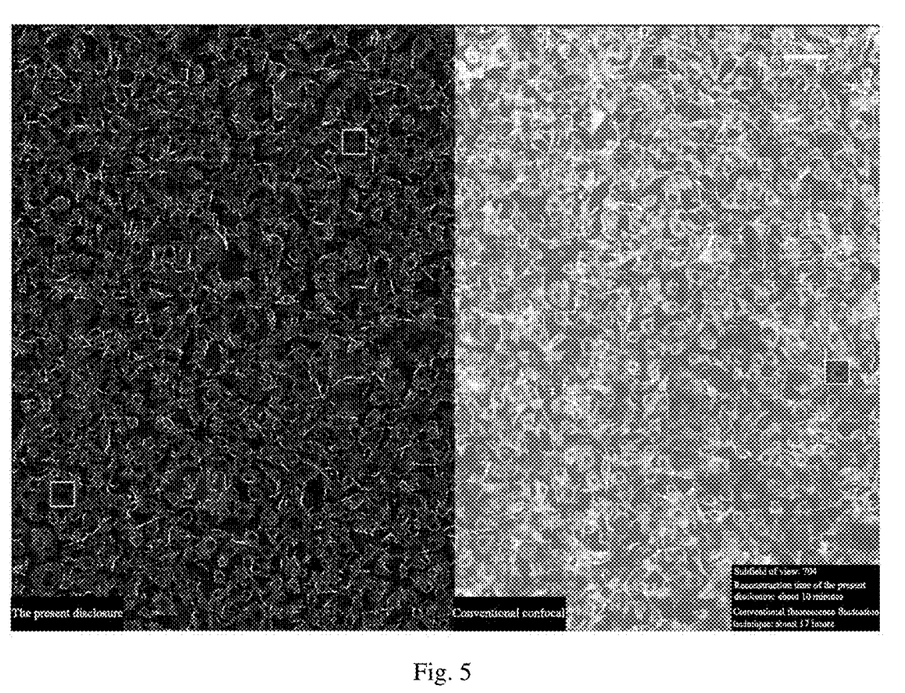
FIG. 5 is an exemplary result diagram of an automated high-throughput reconstruction according to Embodiment 1 of the present disclosure.

FIG. 4 and FIG. 5 are exemplary results showing the non-parametric reconstruction capability and automated high-throughput reconstruction, respectively. With the advantage of non-parameterization, an automatic parameter estimation method based on rolling FRC is proposed in the embodiments of the present disclosure to realize non-parameterization, to realize automatic super-resolution high-throughput imaging (microtubules labeled with quantum dots in COS-7 cells). The embodiment images a large field of view of 2.0 mm by 1.4 mm, containing more than 2,000 cells, composed of about 2,400,000,000 (2.4 billion) pixels (32.5 nm by 32.5 nm each), and spanning a regional spatial dimension of almost five orders of magnitude. The embodiment requires only about 10 minutes for its reconstruction, compared to about 17 hours for conventional fluorescence fluctuation technique SOFI to achieve similar imaging performance.

It should be noted that while the method operations of the above embodiments are described in a particular order, this does not require or imply that the operations must be performed in the specific order, or that all illustrated operations must be performed to achieve the desired results. Rather, the depicted steps may change the order of execution. Additionally, or alternatively, certain steps may be omitted; a plurality of steps are combined into one step for execution; and/or one step is decomposed into a plurality of steps for execution.

Embodiment 2

Figure 6:
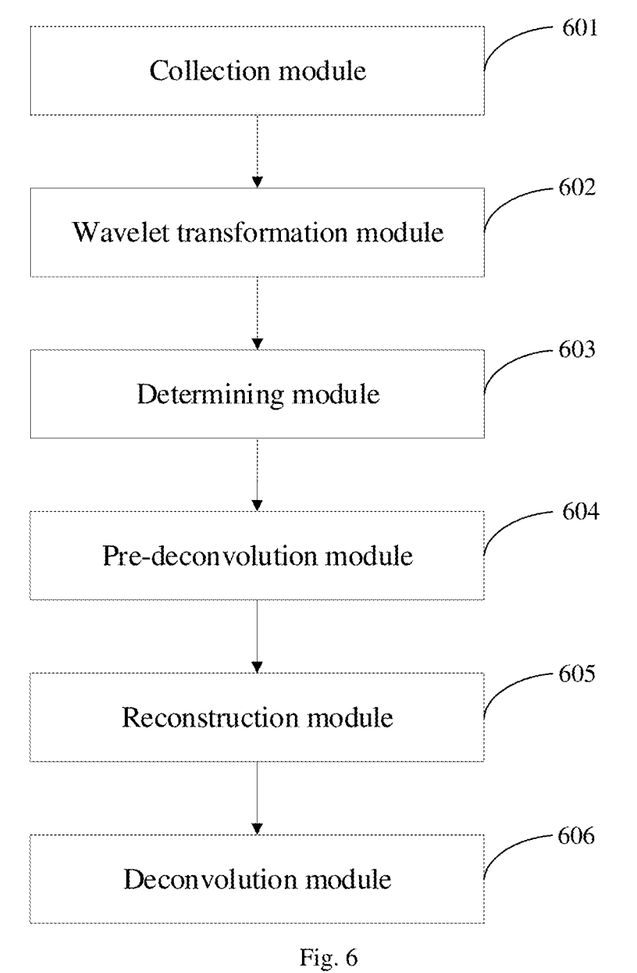
FIG. 6 is a structural block diagram of a super-resolution microscopic imaging apparatus according to Embodiment 2 of the present disclosure.

As shown in FIG. 6, the embodiment provides a super-resolution microscopic imaging apparatus including a collection module 601, a wavelet transformation module 602, a determining module 603, a pre-deconvolution module 604, a reconstruction module 605, and a deconvolution module 606, each of which is described in detail as follows:
    the collection module 601 is configured to collect a fluorescent signal sequence of a set of samples to be observed;
    the wavelet transformation module 602 is configured to estimate a background of the fluorescent signal using a wavelet transformation and remove background noise;
    the determining module 603 is configured to determine the number of iterations of deconvolution;
    the pre-deconvolution module 604 is configured to perform an iteration of pre-deconvolution on each frame of an initial image in the fluorescent signal sequence before outputting when the iteration reaches half of the number of iterations;
    the reconstruction module 605 is configured to perform two reconstructions on the output image; and
    the deconvolution module 606 is configured to perform a second iteration of deconvolution on the image after the two reconstructions before outputting when the iteration reaches the number of iterations or half of the number of iterations.

It should be noted that the system provided in the embodiment is merely exemplified by the division of the above functional modules. In practical applications, the above functional allocation may be performed by different functional modules according to needs, that is, the internal structure is divided into different functional modules to perform all or part of the functions described above.

Embodiment 3

Figure 7:
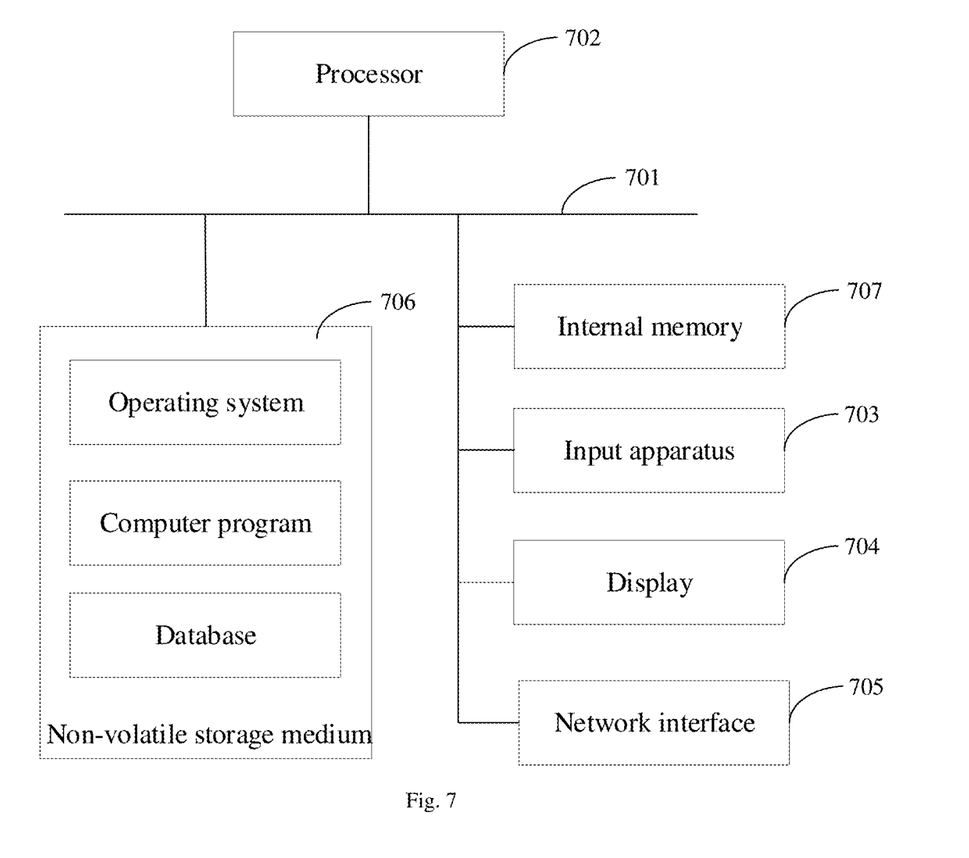
FIG. 7 is a structural block diagram of a computer device according to Embodiment 3 of the present disclosure.

The embodiment provides a computer device, which may be a computer, as shown in FIG. 7, including a processor 702 connected via a system bus 701, a memory, an input apparatus 703, a display 704, and a network interface 705. The processor is configured to provide computing and control capabilities; the memory includes a non-volatile storage medium 706 and an internal memory 707, the non-volatile storage medium 706 storing an operating system, computer programs, and a database, and the internal memory 707 providing an environment for the operation of the operating system and computer programs in the non-volatile storage medium. The processor 702, when executing the computer programs stored in the memory, implements the super-resolution microscopic imaging method of the above Embodiment 1, as follows:

collecting a fluorescent signal sequence of a set of samples to be observed;
  determining the number of iterations of deconvolution;
  performing an iteration of pre-deconvolution on each frame of an initial image in the fluorescent signal sequence before outputting when the iteration reaches half of the number of iterations;
  performing two reconstructions on the output image; and
  performing a second iteration of deconvolution on the image after the two reconstructions before outputting when the iteration reaches the number of iterations or half of the number of iterations.

In one embodiment, after the collecting a sequence of a set of samples to be observed, it further includes:
  estimating a background of the fluorescent signal using a wavelet transformation and removing background noise.

In one embodiment, the estimating a background of the fluorescent signal using a wavelet transformation and removing background noise specifically includes:
  estimating the background from a lowest frequency of an input image using wavelet estimation;
  performing a wavelet inverse transformation on a lowest frequency band to a spatial domain, comparing a result with half of a square root of the input image, and combining the two images by keeping a minimum value of each pixel; and
  taking estimated low-frequency band low-peak background data as a new input image, and performing wavelet estimation circularly until the preset number of cycles is reached.

In one embodiment, the determining the number of iterations of deconvolution specifically includes:
  using rolling FRC to determine, and taking the number of iterations at maximum rolling FRC resolution as the number of iterations of deconvolution.

In one embodiment, the using rolling FRC to determine, and taking the number of iterations at maximum rolling FRC resolution as the number of iterations of deconvolution specifically includes:
  taking the rolling FRC as a function of spatial frequency, and defining discretization of the spatial frequency of a rolling FRC curve to calculate a discrete value of the corresponding spatial frequency;
  smoothing the rolling FRC curve with noise using an average filter with average window half-width;
  defining, when the rolling FRC curve is lower than a given threshold, the frequency as an effective cutoff frequency and the resolution as a reciprocal of the effective cutoff frequency, the given threshold representing a maximum spatial frequency of meaningful information outside the random noise; and
  taking the number of iterations at maximum resolution as the number of iterations of deconvolution.

In one embodiment, the performing two reconstructions on the output image specifically includes:
  performing a first reconstruction on the output image using a fluctuation principle of the fluorescent signal; and
  performing a second reconstruction on the image after the first reconstruction using sparsity-continuity joint constraints.

In one embodiment, the performing a first reconstruction on the output image using a fluctuation principle of the fluorescent signal specifically includes:
  acquiring an expression of the fluorescent signal according to a PSF, a luminance constant of a fluorescent molecule, and a function of fluctuation of the luminance of the fluorescent molecule with time of a microscope;
  acquiring, according to the expression of the fluorescent signal, an expression of time cumulant with zero-time delay using individual fluctuation characteristics of each fluorescent molecule; and
  expanding the expression of the time cumulant, and regarding a cross-correlation term of a time cumulant expansion as zero when a preset condition is met, to make the time cumulant being expressed as the sum of squares of a corresponding luminance constant weighted PSF.

In one embodiment, the performing a second reconstruction on the image after the first reconstruction using sparsity-continuity joint constraints specifically includes:
  constructing a reconstruction model, the reconstruction model including a first term, a second term, and a third term, the first term being a fidelity term representing a distance between the image after the first reconstruction and a collected initial image, the second term representing a continuity constraint of the image after the first reconstruction, and the third term representing a sparsity constraint of the image after the first reconstruction; and
  performing a second reconstruction on the image after the first reconstruction using the reconstruction model.

In one embodiment, the iteration of deconvolution specifically includes:
  obtaining an iterative formula by iteratively solving maximum likelihood in a spatial domain; and
  realizing, according to the iterative formula, an iterative calculation of deconvolution using an acceleration method based on vector extrapolation.

Embodiment 4

The embodiment provides a storage medium, which is a computer-readable storage medium storing computer programs; the computer programs, when executed by a processor, implement the above super-resolution microscopic imaging method of Embodiment 1, as follows:
  collecting a fluorescent signal sequence of a set of samples to be observed;
  determining the number of iterations of deconvolution;
  performing an iteration of pre-deconvolution on each frame of an initial image in the fluorescent signal sequence before outputting when the iteration reaches half of the number of iterations;
  performing two reconstructions on the output image; and
  performing a second iteration of deconvolution on the image after the two reconstructions before outputting when the iteration reaches the number of iterations or half of the number of iterations.

In one embodiment, after the collecting a sequence of a set of samples to be observed, it further includes:

estimating a background of the fluorescent signal using a wavelet transformation and removing background noise.

In one embodiment, the estimating a background of the fluorescent signal using a wavelet transformation and removing background noise specifically includes:

estimating the background from a lowest frequency of an input image using wavelet estimation;

performing a wavelet inverse transformation on a lowest frequency band to a spatial domain, comparing a result with half of a square root of the input image, and combining the two images by keeping a minimum value of each pixel; and taking estimated low-frequency band low-peak background data as a new input image, and performing wavelet estimation circularly until the preset number of cycles is reached.

In one embodiment, the determining the number of iterations of deconvolution specifically includes:

using rolling FRC to determine, and taking the number of iterations at maximum rolling FRC resolution as the number of iterations of deconvolution.

In one embodiment, the using rolling FRC to determine, and taking the number of iterations at maximum rolling FRC resolution as the number of iterations of deconvolution specifically includes:

taking the rolling FRC as a function of spatial frequency, and defining discretization of the spatial frequency of a rolling FRC curve to calculate a discrete value of the corresponding spatial frequency;

smoothing the rolling FRC curve with noise using an average filter with average window half-width;

defining, when the rolling FRC curve is lower than a given threshold, the frequency as an effective cutoff frequency and the resolution as a reciprocal of the effective cutoff frequency, the given threshold representing a maximum spatial frequency of meaningful information outside the random noise; and taking the number of iterations at maximum resolution as the number of iterations of deconvolution.

In one embodiment, the performing two reconstructions on the output image specifically includes:

performing a first reconstruction on the output image using a fluctuation principle of the fluorescent signal; and performing a second reconstruction on the image after the first reconstruction using sparsity-continuity joint constraints.

In one embodiment, the performing a first reconstruction on the output image using a fluctuation principle of the fluorescent signal specifically includes:

acquiring an expression of the fluorescent signal according to a PSF, a luminance constant of a fluorescent molecule, and a function of fluctuation of the luminance of the fluorescent molecule with time of a microscope;

acquiring, according to the expression of the fluorescent signal, an expression of time cumulant with zero-time delay using individual fluctuation characteristics of each fluorescent molecule; and expanding the expression of the time cumulant, and regarding a cross-correlation term of a time cumulant expansion as zero when a preset condition is met, to make the time cumulant being expressed as the sum of squares of a corresponding luminance constant weighted PSF.

In one embodiment, the performing a second reconstruction on the image after the first reconstruction using sparsity-continuity joint constraints specifically includes:

constructing a reconstruction model, the reconstruction model including a first term, a second term, and a third term, the first term being a fidelity term representing a distance between the image after the first reconstruction and a collected initial image, the second term representing a continuity constraint of the image after the first reconstruction, and the third term representing a sparsity constraint of the image after the first reconstruction; and performing a second reconstruction on the image after the first reconstruction using the reconstruction model.

In one embodiment, the iteration of deconvolution specifically includes:

obtaining an iterative formula by iteratively solving maximum likelihood in a spatial domain; and realizing, according to the iterative formula, an iterative calculation of deconvolution using an acceleration method based on vector extrapolation.

The present disclosure has the advantages of high flexibility and can be widely coupled to various imaging modalities, such as acoustic microscopy, namely photoacoustic and ultrasonic microscopy imaging technology; it has the advantage of high throughput, and the post-deconvolution of multiple iterations is used to further process the obtained single image, which can achieve a two-fold improvement in three-dimensional spatial resolution. High-quality super-resolution results can be achieved with only 20 frames while maintaining super-resolution, achieving a temporal resolution improvement of 50 to 100 times. With the advantage of non-parameterization, an automatic parameter estimation method based on rolling FRC is proposed to realize non-parameterization, to realize automatic super-resolution high-throughput imaging.

Note that the computer-readable storage medium of the embodiment may be either a computer-readable signal medium or a computer-readable storage medium, or any combination thereof. The computer-readable storage medium may be, for example but not limited to, an electronic, magnetic, optical, electromagnetic, infrared, or semiconductor system, apparatus, or element, or any combination thereof. More specific examples of the computer-readable storage medium may include, but are not limited to an electrical connection with one or more wires, a portable computer diskette, a hard disk, a random-access memory (RAM), a read-only memory (ROM), an erasable programmable read-only memory (EPROM or flash memory), an optical fiber, a portable compact disk read-only memory (CD-ROM), an optical storage element, a magnetic storage element, or any suitable combination thereof.

In the embodiment, the computer-readable storage medium may be any tangible medium that contains or stores programs that may be used by or in connection with an instruction execution system, apparatus, or element. In the embodiment, the computer-readable signal medium may include data signals embodied in baseband or propagated as part of a carrier wave carrying the computer-readable programs. The propagated data signals may take many forms, including but not limited to, electromagnetic signals, optical signals, or any suitable combination thereof. The computer-readable signal medium may also be any computer-readable storage medium that can send, propagate, or transmit the programs for use by or in connection with the instruction execution system, apparatus, or element. The computer programs embodied on the computer-readable storage medium may be transmitted over any suitable medium including, but not limited to wire, fiber optic cable, RF (radio frequency), and the like, or any suitable combination thereof.

The computer-readable storage medium may be used in one or more programming languages or combinations thereof to write computer programs for executing the embodiment, including object-oriented programming languages such as Java, Python, C++, and conventional procedural programming languages, such as C language or similar programming languages. The programs may be executed entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (for example, through the Internet using an Internet service provider).

The computer program code required for the operation of various portions of the present application may be written in any one or more programming languages, including object-oriented programming languages such as Java, Scala, Smalltalk, Eiffel, JADE, Emerald, C++, C #, VB. NET, Python, and the like; conventional procedural programming languages such as C programming language, VisualBasic, Fortran2103, Perl, COBOL2102, PHP, ABAP; dynamic programming languages such as Python, Ruby, and Groovy, or other programming languages, and the like. The program codes may be executed entirely on the user's computer, partly on the user's computer as a stand-alone software package, partly on the user's computer and partly on a remote computer, or entirely on the remote computer or server. In the latter case, the remote computer may be connected to the user's computer via any form of network, such as a LAN or WAN, or to an external computer (for example, via the Internet), or in a cloud computing environment, or as a service using for example, Software as a Service (SaaS).

Furthermore, except as expressly stated in the claims, the order of processing elements and sequences, the use of numeric letters, or the use of other names described in the present application are not intended to define the order of the process and methods of the present application. While in the foregoing disclosure some embodiments of the present disclosure have been discussed by way of various examples, it is to be understood that such details serve for illustrative purposes only and that the appended claims are not limited to the disclosed embodiments; but on the contrary, the claims are intended to cover all modifications and equivalent combinations consistent with the substance and scope of the embodiments of the present application. For example, although the various components may be implemented in hardware devices, they may also be implemented as pure software solutions, such as installations on existing servers or mobile devices.

Finally, it is to be understood that the embodiments described in the present application are merely illustrative of the principles of the embodiments of the present application. Other variations are possible within the scope of the present application. Thus, by way of example and not limitation, alternative configurations of the embodiments of the present application may be considered consistent with the teachings of the present application. Accordingly, the embodiments of the present application are not limited to the embodiments explicitly described and illustrated herein.

The invention claimed is:

1. A super-resolution microscopic imaging method, comprising:
    collecting a fluorescent signal sequence of a set of samples to be observed;
    determining the number of iterations of deconvolution;
    performing an iteration of pre-deconvolution on each frame of an initial image in the fluorescent signal sequence before outputting when the iteration reaches half of the number of iterations;
    performing two reconstructions on the output image; and
    performing a second iteration of deconvolution on the image after the two reconstructions before outputting when the iteration reaches the number of iterations or half of the number of iterations.

2. The super-resolution microscopic imaging method according to claim 1, after the collecting a sequence of a set of samples to be observed, further comprising:
    estimating a background of the fluorescent signal using a wavelet transformation and removing background noise.

3. The super-resolution microscopic imaging method according to claim 2, wherein the estimating a background of the fluorescent signal using a wavelet transformation and removing background noise specifically comprises:
    estimating the background from a lowest frequency of an input image using wavelet estimation;
    performing a wavelet inverse transformation on a lowest frequency band to a spatial domain, comparing a result with half of a square root of the input image, and combining the two images by keeping a minimum value of each pixel; and
    taking estimated low-frequency band low-peak background data as a new input image, and performing wavelet estimation circularly until the preset number of cycles is reached.

4. The super-resolution microscopic imaging method according to claim 1, wherein the determining the number of iterations of deconvolution specifically comprises:
    using rolling Fourier ring correlation (FRC) to determine, and taking the number of iterations at maximum rolling FRC resolution as the number of iterations of deconvolution.

5. The super-resolution microscopic imaging method according to claim 4, wherein the using rolling FRC to determine, and taking the number of iterations at maximum rolling FRC resolution as the number of iterations of deconvolution specifically comprises:
    taking the rolling FRC as a function of spatial frequency, and defining discretization of the spatial frequency of a rolling FRC curve to calculate a discrete value of the corresponding spatial frequency;
    smoothing the rolling FRC curve with noise using an average filter with average window half-width;
    defining, when the rolling FRC curve is lower than a given threshold, the frequency as an effective cutoff frequency and the resolution as a reciprocal of the effective cutoff frequency, the given threshold representing a maximum spatial frequency of meaningful information outside the random noise; and
    taking the number of iterations at maximum resolution as the number of iterations of deconvolution.

6. The super-resolution microscopic imaging method according to claim 1, wherein the performing two reconstructions on the output image specifically comprises:

performing a first reconstruction on the output image using a fluctuation principle of the fluorescent signal; and performing a second reconstruction on the image after the first reconstruction using sparsity-continuity joint constraints.

7. The super-resolution microscopic imaging method according to claim 6, wherein the performing a first reconstruction on the output image using a fluctuation principle of the fluorescent signal specifically comprises:

acquiring an expression of the fluorescent signal according to a point spread function (PSF), a luminance constant of a fluorescent molecule, and a function of fluctuation of the luminance of the fluorescent molecule with time of a microscope;

acquiring, according to the expression of the fluorescent signal, an expression of time cumulant with zero-time delay using individual fluctuation characteristics of each fluorescent molecule; and expanding the expression of the time cumulant, and regarding a cross-correlation term of a time cumulant expansion as zero when a preset condition is met, to make the time cumulant being expressed as the sum of squares of a corresponding luminance constant weighted PSF.

8. The super-resolution microscopic imaging method according to claim 6, wherein the performing a second reconstruction on the image after the first reconstruction using sparsity-continuity joint constraints specifically comprises:

constructing a reconstruction model, the reconstruction model comprising a first term, a second term, and a third term, the first term being a fidelity term representing a distance between the image after the first reconstruction and a collected initial image, the second term representing a continuity constraint of the image after the first reconstruction, and the third term representing a sparsity constraint of the image after the first reconstruction; and performing a second reconstruction on the image after the first reconstruction using the reconstruction model.

9. The super-resolution microscopic imaging method according to claim 1, wherein the iteration of deconvolution specifically comprises:

obtaining an iterative formula by iteratively solving maximum likelihood in a spatial domain; and realizing, according to the iterative formula, an iterative calculation of deconvolution using an acceleration method based on vector extrapolation.

10. A super-resolution microscopic imaging apparatus, comprising:

a collection module, configured to collect a fluorescent signal sequence of a set of samples to be observed;

a determining module, configured to determine the number of iterations of deconvolution;

a pre-deconvolution module, configured to perform an iteration of pre-deconvolution on each frame of an initial image in the fluorescent signal sequence before outputting when the iteration reaches half of the number of iterations;

a reconstruction module, configured to perform two reconstructions on the output image; and a deconvolution module, configured to perform a second iteration of deconvolution on the image after the two reconstructions before outputting when the iteration reaches the number of iterations or half of the number of iterations.

11. A computer device comprising a processor and a memory for storing processor-executable programs, the processor, when executing the programs stored in the memory, implementing the super-resolution microscopic imaging method claim 1.

12. A storage medium storing programs thereon, the programs, when executed by a processor, implementing the super-resolution microscopic imaging method according to claim 1.

* * * * *